Feb. 11, 1947.  J. L. HUSTON  2,415,692
FISHING FLOAT
Filed May 17, 1944
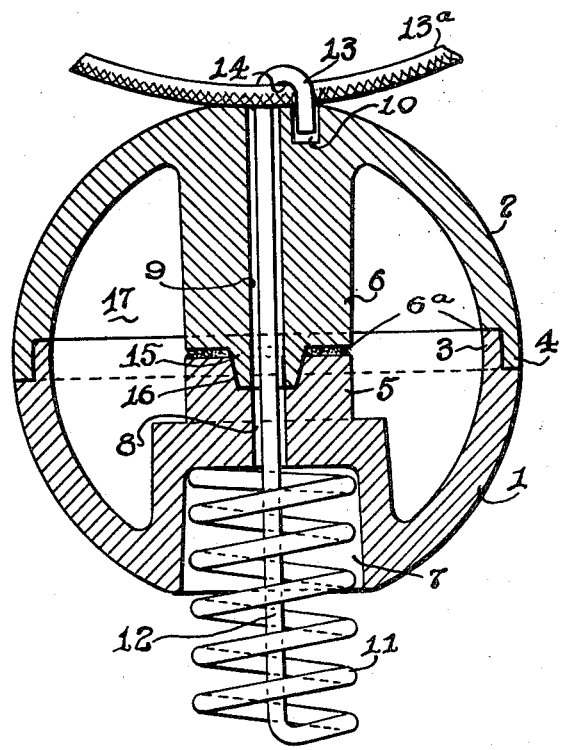
INVENTOR
JAMES L. HUSTON,
BY
John D. McLirau
ATTORNEY Patented Feb. 11, 1947

2,415,692

UNITED STATES PATENT OFFICE 2,415,692

FISHING FLOAT

James L. Huston, Arcanum, Ohio

Application May 17, 1944, Serial No. 535,998

6 Claims. (Cl. 43—49)

This invention relates to improvements in floats for use by fishermen and has for its object to provide a float adapted to be used in casting or in still fishing.

It is also an object of this invention to provide a float composed of two semi-spherical parts adapted to engage each other in such a way as to form a unitary and complete spherical float.

It is a further object of this invention to provide a float composed of two parts, each being colored differently from the other.

It is also an object of this invention to provide a float composed of two parts separately manufactured and resiliently held together so that there is formed a complete unitary float.

It is also an object of this invention to provide a float composed of two parts held together by means of some resilient agency, each part being made of some plastic material and colored differently from each other.

It is also an object of this invention to provide a float with phosphorescent materials therein to indicate the position of the float. The phosphorescent nature of the float is helpful in night fishing.

These and other objects and advantages will appear from the following description taken in connection with the drawing, which is a vertical section through the float.

The body of the float is composed of two hollow members, indicated by the numerals 1 and 2. These members are shown to be semi-spherical and hollow, but may be in other cooperating shapes. The members are provided with overlapping parts 3 and 4, the part 3 being located on the member 1 while the part 4 is located on the member 2. The members are cut away to provide seats for the parts 3 and 4. The member 1 has an internal projection 5 adapted to align with a similar projection 6 on the member 2. The projection 6 is provided with a cone-shaped extension 15 which fits into a similarly shaped pocket 16 in the projection 5. Between the two hollow members 1 and 2 is a layer 6a of some adhesive material, which holds the two members together in a water tight condition. By this means there is provided in the float an air cavity 17.

In the member 1 and extending partly into the projection 5 is a pocket 7. Extending from the bottom of the pocket 7 and through the projection 5 in a radial direction is a hole 8 aligning with a similar hole 9 in projection 6. Adjacent the hole 9 in the outer surface of the member 2 is a pocket 10. Fitting in the pocket 7 is one end of a coiled spring 11. One end of this coiled spring rests on the bottom of the pocket 7 while the other end of the coiled spring 11 continues into a stem 12 passing through the coiled spring, through the hole 8 and the hole 9 past the outer surface of the member 2. The stem 12 at its upper end is bent to form a loop 13 having a free end adapted to fit in the socket 10. This loop 13 and the surface of the member 2 form an opening 14 through which a fishing line may extend.

Whenever the free end of the loop 13 is in the socket 10, the line 13a is gripped between the loop 13 and the member 2 so that the float will not slip on the line. By pressing on the outer end of the spring the free end of the loop 13 may be withdrawn from the socket 10 and the spring rotated so that the free end of the loop 13 will rest upon the outer surface of the member 2. When the loop 13 is in this position the line passing through the opening 14 may easily slide. When the members are in this position, the float is used for casting. When the float is used for still fishing the end of the loop 13 is in the socket 10 so that the line is gripped and held in firm, fixed position. The coiled spring 11 not only acts as a clamping agency but acts as a weight and will tend to hold the spring part of the float underneath the water so that the other part of the float is exposed to view above the water. Whenever the float is in this position there is indication that the hook is resting. Whenever the hook is not resting weight is applied to the loop 13 so that the part of the float adjacent the spring 11 is exposed to view.

The position of the float may be indicated by the color of the members 1 and 2. The member 1 may be transparent and have an inside lining of phosphorescent material so that when the spring 11 is projecting upward the part 1 is in view and may be seen at night time by the phosphorescent nature of this member. Whenever the hook is resting, the loop 13 end of the float is projecting upward and may be indicated by a color different from that of the other member. If this member of the float is not phosphorescent and the member 1 is, the fact that the member 2 is not phosphorescent would indicate at night that the hook is resting.

What I claim as my invention is:

1. In a float, a pair of semispherical members fitted together to form a float body, one member having a pocket therein, a coil spring in said pocket and means on the spring engaging the other member and extending through both members to hold the members together.

2. In a float, a pair of semispherical members fitted together to form a float body, one member having a pocket therein, a coil spring in said pocket and means on the spring engaging the other member to hold the members together, said means comprising a loop cooperating with the body to clamp a fish line.

3. In a float, a pair of members forming a float body, one of said members having a pocket therein, both of said members having a hole therein extending from the bottom of the pocket through both members, a coil spring having one end in the pocket and a stem extending from the other end of the spring through the hole, and means on the stem cooperating with the body to hold the members together and clamp a fish line.

4. In a float composed of two hollow semispherical members, one of said members having a pocket therein, and a coil spring in said pocket having a stem thereon extending through the spring and both of said members and engaging the other member to hold the members together.

5. In a float, a pair of semispherical hollow members fitted together to form a spherical body, each of said members having thereon an internal projection, said members having through the projections a hole, and a coil spring engaging one of said members and having a stem passing through said hole and engaging the other member to hold the members together.

6. In a spherical float, a pair of hollow semispherical members, each of said members having therein a projection, the members having therein and extending through the projections a hole, means extending through the hole and engaging the members to hold the members together and means on said means cooperating with one of said members to clamp a fish line.

JAMES L. HUSTON.

REFERENCES CITED

The following references are of record in the file of this patent:

UNITED STATES PATENTS

| Number | Name | Date |
|---|---|---|
| 2,112,385 | Smith | Mar. 29, 1938 |
| 573,572 | Dales | Dec. 22, 1896 |
| 1,504,065 | Lower | Aug. 5, 1924 |
| 2,231,270 | Huston | Feb. 11, 1941 |
| 855,659 | O'Brien | June 4, 1907 |
| 1,463,020 | Olson | July 24, 1923 |
| 241,150 | Norwood | May 10, 1881 |
| 1,241,707 | Capooch et al. | Oct. 2, 1917 |
| 1,973,028 | Thomas | Sept. 11, 1934 |